United States Patent [19]

Kawai et al.

[11] Patent Number: 5,583,191
[45] Date of Patent: Dec. 10, 1996

[54] PLASTIC LENS

[75] Inventors: Toshiyasu Kawai, Ichihara; Minoru Suzuki, Funabashi; Hiromasa Kawai; Fumiaki Kanega, both of Ichihara, all of Japan

[73] Assignee: Hitachi Chemical Company, Ltd., Tokyo, Japan

[21] Appl. No.: 464,124

[22] Filed: Jun. 5, 1995

Related U.S. Application Data

[62] Division of Ser. No. 360,350, Dec. 21, 1994, abandoned.

[30] Foreign Application Priority Data

Dec. 27, 1993 [JP] Japan ...................... 5-329446
Aug. 9, 1994 [JP] Japan ...................... 6-187173

[51] Int. Cl.$^6$ .................................... C08F 20/26
[52] U.S. Cl. ............................................ 526/320
[58] Field of Search ................................. 526/320

[56] References Cited

FOREIGN PATENT DOCUMENTS 2342510 9/1977 France .
0094731 5/1984 Japan .
0109001 6/1984 Japan .

*Primary Examiner*—Joseph L. Schofer
*Assistant Examiner*—N. Sarofim
*Attorney, Agent, or Firm*—Antonelli, Terry, Stout & Kraus

[57] ABSTRACT

A transparent resin obtained by polymerizing a monomer having an alkylene oxide group, a polyfunctional (meth-)acrylate having a divalent branched hydrocarbon group and other copolymerizable vinyl monomer, if necessary, is suitable as an elementary material for a plastic lens with excellent heat resistance and hue.

10 Claims, No Drawings

PLASTIC LENS

This is a division of application Ser. No. 360,350, filed Dec. 21, 1994 abandoned.

BACKGROUND OF THE INVENTION

The present invention relates to a transparent resin utilizable as an elementary material of plastic lens, a process for production of said resin, a plastic lens, and a casting composition for production of the transparent resin.

As a material of optical lenses, resins of high transparency such as acrylic resin, diethylene glycol bis-allylcarbonate resin (for example, CR-39), polystyrene, polycarbonate and the like have hitherto been used. Of these resins, diethylene glycol bis-allylcarbonate resin which is a thermosetting resin is most extensively used as a material of eyeglass lens. This is due to the high transparency, low dispersibility (high Abbe number) and excellence in heat and impact resistances.

However, a lens made of diethylene glycol bis-allylcarbonate is disadvantageous in that its refractive index is as low as 1.50 and its thickness is unavoidably greater than that of a lens made of glass (this tendency becomes more marked as thickness of lens increases). Further, this type of lens is inferior in abrasion resistance, like general plastic lenses. Although a method of coating the surface of this type of lens with an organosilane type hard coat film has been proposed in order to overcome this disadvantage, an untreated plastic lens is insufficient in adhesive strength to the organosilane type hard coat film and cannot make a uniform adhesion. In other words, the organosilane type hard coat can be formed only after treating the surface of plastic lens.

Further, it is an increasing demand of the time to reduce the weight of eyeglass, so that material of low specific gravity for production of eyeglass is actively being studied. For example, Japanese Patent Unexamined Publication No. (JP-A) 2-238006 has proposed acrylic resins using 2,2-dialkyl-1,3-propane-di(meth)acrylate. This material, however, is unsatisfactory because its specific gravity is so high as about 1.31 to 1.35 and this material is inferior in dyeability and adhesiveness to organosilane type hard coat film. In JP-A-5-215903, there has been proposed a copolymer constituted of [di(meth)acrylate having straight chain alkyl group as spacer]/[(meth)acrylate having alkyl group]/aromatic vinyl compound/other monomer. Although this material has a low specific gravity, it is readily deformable in the process of dyeing and hard coating due to its low heat resistant temperature. Further, all the materials mentioned above are insufficient in strength so that they are readily breakable in the course of boring process.

JP-A-4-126710 has proposed a copolymer constituted of [alkylene oxide group-containing bifunctional (meth)acrylate]/[aromatic vinyl monomer]/[polymerizable monomer or polymerizable oligomer having a polymerizable double bond and a molecular weight of 98 or above]. However, this material is yet insufficient in the lowness of specific gravity and its hue tends to become yellowish.

Further, as resins improved in the adhesive property to hard coat film, a copolymer constituted of [aromatic ring-containing di(meth)acrylate]/[aromatic ring-containing monomer]/[hydroxyl group-containing monomer] (JP-A-58-76410) and a copolymer constituted of [aromatic ring-containing di(meth)acrylate]/[aromatic ring-containing monomer]/[epoxy group-containing monomer] (JP-A-58-89606) have been proposed. These materials, however, are yet unsatisfactory in the adhesive property to organosilane type hard coat film, even though adhesion to glass film after glass vapor deposition is improved. Further, the latter resin is undesirable from the viewpoint of moldability because its adhesiveness to glass mold used in cast polymerization process excessively increases as the proportion of epoxy group-containing monomer in the copolymer increases.

As has been mentioned above, there has hitherto been disclosed no plastic lens nor resin for plastic lens which is excellent in hue and well-balanced between strength at the time of boring processing and specific gravity, has the properties required of a plastic lens, and can directly be coated with an organosilane type hard coat film without surface treatment.

SUMMARY OF THE INVENTION

It is an object of the present invention to provide a transparent resin excellent in the hue and well-balanced between strength at the time of boring processing and specific gravity, a process for producing said transparent resin, a plastic lens made of said transparent resin, and a casting composition for production of the transparent resin. It is another object of the present invention to provide a transparent resin which has a low dispersibility (high Abbe number), a high refractive index, an excellent dyeing property and a high heat resistance in addition to the above-mentioned characteristic properties, a process for producing said transparent resin, and a plastic resin made of said transparent resin. It is a further object of the present invention to provide a transparent resin which can directly be coated with an organosilane type hard coat film without surface treatment, a process for producing said transparent resin, and a plastic lens made of said transparent resin.

The present invention provides a transparent resin comprising, as constituent components of the resin molecules, a polymerizable monomer mixture obtained by compounding:

1 to 80 parts by weight of an alkylene oxide group-containing monomer represented by the following general formula (I):

wherein $R^1$ is an acryloyl group or a methacryloyl group; $R^2$ is an alkylene group having 1 to 5 carbon atoms; $R^3$ is a hydrogen atom, an acryloyl group, a methacryloyl group or a monovalent hydrocarbon group other than those mentioned above and having 1 to 40 carbon atoms; and n is an integer of 9 to 50;

1 to 95 parts by weight of a polyfunctional (meth)acrylate represented by the following general formula (II):

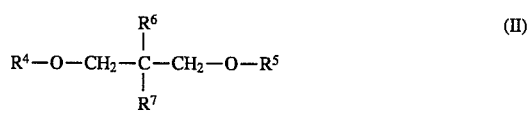

wherein $R^4$ and $R^5$ are independently an acryloyl group or a methacryloyl group; and $R^6$ and $R^7$ are independently a monovalent hydrocarbon group having 1 to 6 carbon atoms; and 0 to 90 parts by weight of other copolymerizable vinyl monomer, so that total amount of monomers comes to 100 parts by weight.

Further, the present invention provides a process for producing a transparent resin which comprises polymerizing the polymerizable monomer mixture mentioned above.

The transparent resin has desirably a specific gravity of 1.15 or below, a refractive index of 1.54 or above and an Abbe number of 35 or above. Furthermore, the transparent resin in the invention has a specific gravity of 1.05 or above, a refractive index of 1.57 or below and an Abbe number of 50 or below in many case.

Furthermore, the present invention provides a plastic lens obtained from the transparent resin mentioned above.

DESCRIPTION OF THE PREFERRED EMBODIMENTS

The alkylene oxide group-containing monomer used for production of the transparent resin of the present invention is represented by the formula (I):

$$R^1\text{-}O\text{-}(R^2O)_n\text{-}R^3 \qquad (I)$$

wherein $R^1$ is an acryloyl group or a methacryloyl group; $R^2$ is an alkylene group having 1 to 5 carbon atoms; $R^3$ is a hydrogen atom, an acryloyl group, a methacryloyl group or a monovalent hydrocarbon group other than those mentioned above and having 1 to 40 carbon atoms; and n is an integer of 9 to 50.

The alkylene oxide group-containing monomers represented by the above-mentioned formula (I) include monofunctional monomers and polyfunctional monomers.

Among the alkylene oxide group-containing monomers represented by the above-mentioned formula (I), the monofunctional monomers include:

polymethylene glycol monoacrylates such as nonamethylene glycol monoacrylate, tridecamethylene glycol monoacrylate, tetradecamethylene glycol monoacrylate, tricosamethylene glycol monoacrylate and the like;

polymethylene glycol monomethacrylates such as nonamethylene glycol monomethacrylate, tridecamethylene glycol monomethacrylate, tetradecamethylene glycol monomethacrylate, tricosamethylene glycol monomethacrylate and the like;

alkoxypolymethylene glycol acrylates such as methoxynonamethylene glycol acrylate, methoxytridecamethylene glycol acrylate, methoxytetradecamethylene glycol acrylate, methoxytricosamethylene glycol acrylate, ethoxynonamethylene glycol acrylate, ethoxytridecamethylene glycol acrylate, ethoxytetradecamethylene glycol acrylate, ethoxytricosamethylene glycol acrylate and the like;

alkoxypolymethylene glycol methacrylates such as methoxynonamethylene glycol methacrylate, methoxytridecamethylene glycol methacrylate, methoxytetradecamethylene glycol methacrylate, methoxytricosamethylene glycol methacrylate, ethoxynonamethylene glycol methacrylate, ethoxytridecamethylene glycol methacrylate, ethoxytetradecamethylene glycol methacrylate, ethoxytricosamethylene glycol methacrylate and the like;

polyethylene glycol monoacrylates such as nonaethylene glycol monoacrylate, tridecaethylene glycol monoacrylate, tetradecaethylene glycol monoacrylate, tricosaethylene glycol monoacrylate and the like;

polyethylene glycol monomethacrylates such as nonaethylene glycol monomethacrylate, tridecaethylene glycol monomethacrylate, tetradecaethylene glycol monomethacrylate, tricosaethylene glycol monomethacrylate and the like;

alkoxypolyethylene glycol acrylates such as methoxynonaethylene glycol acrylate, methoxytridecaethylene glycol acrylate, methoxytetradecaethylene glycol acrylate, methoxytricosaethylene glycol monoacrylate, ethoxynonaethylene glycol acrylate, ethoxytridecaethylene glycol acrylate, ethoxytetradecaethylene glycol acrylate, ethoxytricosaethylene glycol acrylate and the like;

alkoxypolyethylene glycol methacrylates such as methoxynonaethylene glycol methacrylate, methoxytridecaethylene glycol methacrylate, methoxytetradecaethylene glycol methacrylate, methoxytricosaethylene glycol methacrylate, ethoxynonaethylene glycol methacrylate, ethoxytridecaethylene glycol methacrylate, ethoxytetradecaethylene glycol methacrylate, ethoxytricosaethylene glycol methacrylate and the like;

polypropylene glycol monoacrylates such as nonapropylene glycol monoacrylate, dodecapropylene glycol monoacrylate, tridecapropylene glycol monoacrylate and the like;

polypropylene glycol monomethacrylates such as nonapropylene glycol monometharylate, dodecapropylene glycol monomethacrylate, tridecapropylene glycol monomethacrylate and the like;

alkoxypolypropylene glycol acrylates such as methoxynonapropylene glycol acrylate, methoxydodecapropylene glycol acrylate, methoxytridecapropylene glycol acrylate, ethoxynonapropylene glycol acrylate, ethoxydodecapropylene glycol acrylate, ethoxytridecapropylene glycol acrylate and the like;

alkoxypolypropylene glycol methacrylates such as methoxynonapropylene glycol methacrylate, methoxydodecapropylene glycol methacrylate, methoxytridecapropylene glycol methacrylate, ethoxynonapropylene glycol methacrylate, ethoxydodecapropylene glycol methacrylate, ethoxytridecapropylene glycol methacrylate and the like;

polybutylene glycol monoacrylates such as nonabutylene glycol monoacrylate, dodecabutylene glycol monoacrylate, tridecabutylene glycol monoacrylate and the like;

polybutylene glycol monomethacrylates such as nonabutylene glycol monomethacrylate, dodecabutylene glycol monomethacrylate, tridecabutylene glycol monomethacrylate and the like;

alkoxypolybutylene glycol acrylates such as methoxynonabutylene glycol acrylate, methoxydodecabutylene glycol acrylate, methoxytridecabutylene glycol acrylate, ethoxynonabutylene glycol acrylate, ethoxydodecabutylene glycol acrylate, ethoxytridecabutylene glycol acrylate and the like;

alkoxypolybutylene glycol methacrylates such as methoxynonabutylene glycol methacrylate, methoxydodecabutylene glycol methacrylate, methoxytridecabutylene glycol methacrylate, ethoxynonabutylene glycol methacrylate, ethoxydodecabutylene glycol methacrylate, ethoxytridecabutylene glycol methacrylate and the like;

polyethylene glycol polypropylene glycol monoacrylates such as heptaethylene glycol tripropylene glycol monoacrylate, nonaethylene glycol propylene glycol monoacrylate, tetraethylene glycol propylene glycol monoacrylate, nonaethylene glycol dipropylene glycol monoacrylate, tetradecaethylene glycol dipropylene glycol monoacrylate, nonaethylene glycol tripropylene glycol monoacrylate, tetradecaethylene glycol tripropylene glycol monoacrylate and the like;

polyethylene glycol polypropylene glycol monomethacrylates such as heptaethylene glycol tripropylene glycol monomethacrylate, nonaethylene glycol propylene glycol monomethacrylate, tetradecaethylene glycol propylene glycol monomethacrylate, nonaethylene glycol dipropylene glycol monomethacrylate, tetradecaethylene glycol dipropylene glycol monomethacrylate, nonaethylene glycol tripropylene glycol monomethacrylate, tetradecaethylene glycol tripropylene glycol monomethacrylate and the like;

polyethylene glycol polybutylene glycol monoacrylates such as decaethylene glycol pentabutylene glycol monoacrylate and the like;

polyethylene glycol polybutylene glycol monomethacrylates such as decaethylene glycol pentabutylene glycol monomethacrylate and the like; etc. These monomers are used either in the form of single monomer or in the form of a mixture of two or more.

Among the alkylene oxide group-containing monomers represented by the formula (I), polyfunctional monomers include the following:

polymethylene glycol diacrylates such as nonamethylene glycol diacrylate, tridecamethylene glycol diacrylate, tetradecamethylene glycol diacrylate, tricosamethylene glycol diacrylate and the like;

polymethylene glycol dimethacrylates such as nonamethylene glycol dimethacrylate, tridecamethylene glycol dimethacrylate, tetradecamethylene glycol dimethacrylate, tricosamethylene glycol dimethacrylate and the like;

polyethylene glycol diacrylates such as nonaethylene glycol diacrylate, tridecaethylene glycol diacrylate, tetradecaethylene glycol diacrylate, tricosaethylene glycol diacrylate and the like;

polyethylene glycol dimethacrylates such as nonaethylene glycol dimethacrylate, tridecaethylene glycol dimethacrylate, tetraethylene glycol dimethacrylate, tricosaethylene glycol dimethacrylate and the like;

polypropylene glycol diacrylates such as nonapropylene glycol diacrylate, dodecapropylene glycol diacrylate, tridecapropylene glycol diacrylate and the like;

polypropylene glycol dimethacrylates such as nonapropylene glycol dimethacrylate, dodecapropylene glycol dimethacrylate, tridecapropylene glycol dimethacrylate and the like;

polybutylene glycol diacrylates such as nonabutylene glycol diacrylate, dodecabutylene glycol diacrylate, tridecabutylene glycol diacrylate and the like;

polybutylene glycol dimethacrylates such as nonabutylene glycol dimethacrylate, dodecabutylene glycol dimethacrylate, tridecabutylene glycol dimethacrylate and the like;

polyethylene glycol polypropylene glycol diacrylates such as heptaethylene glycol tripropylene glycol diacrylate, nonaethylene glycol propylene glycol diacrylate, tetraethylene glycol propylene glycol diacrylate, nonaethylene glycol dipropylene glycol diacrylate, tetradecaethylene glycol dipropylene glycol diacrylate, tetradecaethylene glycol tripropylene glycol diacrylate and the like;

polyethylene glycol polypropylene glycol dimethacrylates such as heptaethylene glycol tripropylene glycol dimethacrylate, nonaethylene glycol propylene glycol dimethacrylate, tetradecaethylene glycol propylene glycol dimethacrylate, nonaethylene glycol dipropylene glycol dimethacrylate, tetradecaethylene glycol dipropylene glycol dimethacrylate, nonaethylene glycol tripropylene glycol dimethacrylate, tetradecaethylene glycol tripropylene glycol dimethacrylate and the like;

polyethylene glycol polybutylene glycol diacrylates such as decaethylene glycol pentabutylene glycol diacrylate and the like;

polyethylene glycol polybutylene glycol dimethacrylates such as decaethylene glycol pentabutylene glycol dimethacrylate and the like; etc. These monomers are used either in the form of a single monomer or in the form of a mixture of two or more monomers.

Among the monomers exemplified above, the following polyfunctional monomers are preferred as the alkylene oxide group-containing monomer represented by the formula (I) from the viewpoint of hue and heat resistance:

polymethylene glycol diacrylates such as nonamethylene glycol diacrylate, tridecamethylene glycol diacrylate, tetradecamethylene glycol diacrylate, tricosamethylene glycol diacrylate and the like;

polymethylene glycol dimethacrylates such as nonamethylene glycol dimethacrylate, tridecamethylene glycol dimethacrylate, tetradecamethylene glycol methacrylate, tricosamethylene glycol dimethacrylate and the like;

polyethylene glycol diacrylates such as nonaethylene glycol diacrylates, tridecaethylene glycol diacrylate, tetradecaethylene glycol diacrylate, tricosaethylene glycol diacrylate and the like;

polyethylene glycol dimethacrylates such as nonaethylene glycol dimethacrylate, tridecaethylene glycol dimethacrylate, tetradecaethylene glycol dimethacrylate, tricosaethylene glycol dimethacrylate and the like;

polypropylene glycol diacrylates such as nonapropylene glycol diacrylate, dodecapropylene glycol diacrylate, tridecapropylene glycol acrylate and the like;

polypropylene glycol dimethacrylates such as nonapropylene glycol dimethacrylate, dodecapropylene glycol dimethacrylate, tridecapropylene glycol dimethacrylate and the like;

polybutylene glycol diacrylates such as nonabutylene glycol diacrylate, dodecabutylene glycol diacrylate, tridecabutylene glycol diacrylate and the like;

polybutylene glycol dimethacrylates such as nonabutylene glycol dimethacrylate, dodecabutylene glycol dimethacrylate, tridecabutylene glycol dimethacrylate and the like;

polyethylene glycol polypropylene glycol diacrylates such as heptaethylene glycol tripropylene glycol diacrylate, nonaethylene glycol propylene glycol diacrylate, tetradecaethylene glycol propylene glycol diacrylate, nonaethylene glycol dipropylene glycol diacrylate, tetradecaethylene glycol dipropylene glycol diacrylate, nonaethylene glycol tripropylene glycol diacrylate, tetradecaethylene glycol tripropylene glycol diacrylate and the like;

polyethylene glycol polypropylene glycol dimethacrylates such as heptaethylene glycol tripropylene glycol dimethacrylate, nonaethylene glycol propylene glycol dimethacrylate, tetradecaethylene glycol propylene glycol dimethacrylate, nonaethylene glycol dipropylene glycol dimethacrylate, tetradecaethylene glycol dipropylene glycol dimethacrylate, nonaethylene glycol tripropylene glycol dimethacrylate, tetradecaethylene glycol tripropylene glycol dimethacrylate and the like;

polyethylene glycol polybutylene glycol diacrylates such as decaethylene glycol pentabutylene glycol diacrylate and the like;

polyethylene glycol polybutylene glycol dimethacrylates such as decaethylene glycol pentabutylene glycol dimethacrylate and the like; etc.

Among the monomers exemplified above, polyalkylene glycol di(meth)acrylates of which alkylene oxide group has 2 to 3 carbon atoms such as those mentioned below are further preferable from the viewpoint of adhesive property to organosilane type hard coat film and dyeability:

polyethylene glycol diacrylates such as nonaethylene glycol diacrylate, tridecaethylene glycol diacrylate, tetradecaethylene glycol diacrylate, tricosaethylene glycol diacrylate and the like;

polyethylene glycol dimethacrylates such as nonaethylene glycol dimethacrylate, tridecaethylene glycol dimethacrylate, tricosaethylene glycol dimethacrylate and the like;

polypropylene glycol diacrylates such as nonapropylene glycol diacrylate, dodecapropylene glycol diacrylate, tridecapropylene glycol diacrylate and the like;

polypropylene glycol dimethacrylates such as nonapropylene glycol dimethacrylate, dodecapropylene glycol dimethacrylate, tridecapropylene glycol dimethacrylate and the like;

polyethylene glycol polypropylene glycol diacrylates such as heptaethylene glycol tripropylene glycol diacrylate, nonaethylene glycol propylene glycol diacrylate, tetradecaethylene glycol propylene glycol diacrylate, nonaethylene glycol dipropylene glycol diacrylate, tetradecaethylene glycol dipropylene glycol diacrylate, nonaethylene glycol tripropylene glycol diacrylate, tetradecaethylene glycol tripropylene glycol diacrylate and the like;

polyethylene glycol polypropylene glycol dimethacrylates such as heptaethylene glycol tripropylene glycol dimethacrylate, nonaethylene glycol propylene glycol dimethacrylate, tetradecaethylene glycol propyleneiglycol dimethacrylate, nonaethylene glycol dipropylene glycol dimethacrylate, tetradecaethylene glycol diproplene glycol dimethacrylate, nonaethylene glycol tripropylene glycol dimethacrylate, tetradecaethylene glycol tripropylene glycol dimethacrylate and the like; etc.

Among the monomers exemplified above, tetradecaethylene glycol di(meth)acrylate is particularly preferable from the viewpoint of hue and the balance between strength at the time of boring processing, dyeability, heat resistance and adhesiveness to organosilane type hard coat film.

Preferably, the alkylene oxide group-containing monomer represented by the formula (I) is used in an amount of 1 to 80 parts by weight per 100 parts by weight of the total monomers. If its amount is smaller than 1 part by weight, the strength at the time of boring processing and the dyeability are apt to deteriorate, and the adhesiveness to organosilane type hard coat is apt to deteriorate. If the amount of monomer (I) is greater than 80 parts by weight, heat resistance is apt to deteriorate, hue is apt to become yellowish, and specific gravity is too high.

For sufficiently improving the strength at the time of boring processing, the dyeability and the adhesiveness to organosilane type hard coat film, it is necessary to use the alkylene oxide group-containing monomer represented by the formula (I) in an amount of at least 5 parts by weight per 100 parts by weight of total monomers. Further, for preventing deterioration of heat resistance, yellowing of hue and increase of specific gravity, the alkylene oxide group-containing monomer represented by formula (I) is used preferably in an amount of 30 parts by weight or less. Thus, the monomer (I) is used more preferably in an amount of 10 to 30 parts by weight and particularly preferably 10 to 20 parts by weight, per 100 parts by weight of total monomers.

Another monomer constituting the transparent resin of the present invention, namely the polyfunctional (meth)acrylate, is represented by the formula (II):

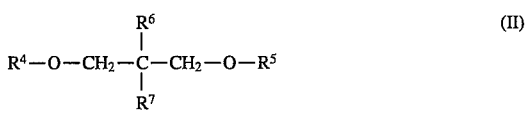

wherein $R^4$ and $R^5$ are independently an acryloyl group or a methacryloyl group; and $R^6$ and $R^7$ are independently a monovalent hydrocarbon group having 1 to 6 carbon atoms.

The polyfunctional (meth)acrylates represented by the formula (II) include polyfunctional acrylates such as 2,2-dimethyl-1,3-propanediol diacrylate, 2-methyl-2-ethyl-1,3-propanediol diacrylate, 2-methyl-2-isopropyl-1,3-propanediol diacrylate, 2-methyl-2-propyl-1,3-propanediol diacrylate, 2,2-diethyl-1,3-propanediol diacrylate, 2-ethyl-2-propyl-1,3-propanediol diacrylate, 2-ethyl-2-isopropyl-1,3-propanediol diacrylate, 2-ethyl-2-butyl-1,3-propanediol diacrylate, 2,2-dipropyl-1,3-diol diacrylate, 2-propyl-2-butyl-1,3-propanediol diacrylate, 2,2-dibutyl-1,3-propanediol diacrylate, 2,2-diisopropyl-1,3-propanediol diacrylate, 2-propyl-2-isopropyl-1,3-propanediol diacrylate, 2-methyl-2-phenyl-1,3-propanediol diacrylate, 2-ethyl-2-phenyl-1,3-propanediol diacrylate, 2-propyl-2-phenyl-1,3-diol diacrylate, 2-isopropyl-2-phenyl-1,3-propanediol diacrylate, 2,2-diphenyl-1,3-propanediol diacrylate, 2-methyl-2-cyclopentyl-1,3-propanediol diacrylate, 2-ethyl-2-cyclopentyl-1,3-propanediol diacrylate, 2-propyl-2-cyclopentyl-1,3-propanediol diacrylate, 2-isopropyl-2-cyclopentyl-1,3-propanediol diacrylate, 2,2-dicyclopentyl-1,3-propanediol diacrylate, 2-methyl-2-cyclohexyl-1,3-propanediol diacrylate, 2-ethyl-2-cyclohexyl-1,3-propanediol diacrylate, 2-propyl-2-cyclohexyl-1,3-propanediol diacrylate, 2-isopropyl-2-cyclohexyl-1,3-propanediol diacrylate, 2,2-dicyclohexyl-1,3-propanediol diacrylate and the like;

polyfunctional methacrylates such as 2,2-dimethyl-1,3-propanediol dimethacrylate, 2-methyl-2-ethyl-1,3-propanediol dimethacrylate, 2-methyl-2-isopropyl-1,3-propanediol dimethacrylate, 2-methyl-2-propyl-1,3-propanediol dimethacrylate, 2,2-diethyl-1,3-propanediol dimethacrylate, 2-ethyl-2-propyl-1,3-propanediol dimethacrylate, 2-ethyl-2-isopropyl-1,3-propanediol dimethacrylate, 2-ethyl-2-butyl-1,3-propanediol dimethacrylate, 2,2-dipropyl-1,3-propanediol dimethacrylate, 2-propyl-2-butyl-1,3-propanediol dimethacrylate, 2,2-dibutyl-1,3-propanediol dimethacrylate, 2,2-diisopropyl-1,3-propanediol dimethacrylate, 2-propyl-2-isopropyl-1,3-propanediol dimethacrylate, 2-methyl-2-phenyl-1,3-propanediol dimethacrylate, 2-ethyl-2-phenyl-1,3-propanediol dimethacrylate, 2-propyl-2-phenyl-1,3-propanediol dimethacrylate, 2-isopropyl-2-phenyl-1,3-propanediol dimethacrylate, 2,2-diphenyl-1,3-propanediol dimethacrylate, 2-methyl-2-cyclopentyl-1, 3-propanediol dimethacrylate, 2-ethyl-2-cyclopentyl-1,3-propanediol dimethacrylate, 2-propyl-2-cyclopentyl-1,3-propanediol dimethacrylate, 2-isopropyl-2-cyclopentyl-1,3propanediol dimethacrylate, 2,2-dicyclopentyl-1,3-propanediol dimethacrylate, 2-methyl-2-cyclohexyl-1,3-propanediol dimethacrylate, 2,2-ethyl-2-cyclohexyl-1,3-propanediol dimethacrylate, 2-propyl-2-cyclohexyl-1,3-propanediol dimethacrylate, 2-isopropyl-2-cyclohexyl-1,3-propanediol dimethacrylate, 2,2-dicyclohexyl-1,3-propanediol dimethacrylate and the like. These monomers are used either in the form of a single monomer or in the form of a mixture of two or more monomers.

Among the polyfunctional (meth)acrylates represented by the formula (II), polyfunctional acrylates such as 2,2-dimethyl-1,3-propanediol diacrylate and the like and polyfunctional methacrylates such as 2,2-dimethyl-1,3-propanediol dimethacrylate, 2-methyl-2-ethyl-1,3-propanediol dimethacrylate, 2-methyl-2-isopropyl-1,3-propanediol dimethacrylate, 2-methyl-2-propyl-1,3-propanediol dimethacrylate, 2,2-diethyl-1,3-propanediol dimethacrylate and the like are preferable from the viewpoint of specific gravity and heat resistance and, among these preferable monomers, 2,2-dimethyl-1,3-propanediol dimethacrylate is particularly preferred.

The polyfunctional (meth)acrylate represented by the formula (II) is used preferably in an amount of 1 to 95 parts by weight per 100 parts by weight of total monomers. If its amount is smaller than 1 part by weight, heat resistance tends to deteriorate and specific gravity is apt to be too high. If its amount exceeds 95 parts by weight, strength at the time of boring processing and dyeability are apt to deteriorate and adhesiveness to organosilane type hard coat film is apt to decrease.

For sufficiently improving the heat resistance of composition, it is preferable to use the polyfunctional (meth)acrylate in an amount of at least 5 parts by weight per 100 parts by weight of total monomers. Further, for preventing the deterioration in the strength at the time of boring processing and the dyeability and the decrease in adhesiveness to organosilane type hard coat film, the polyfunctional (meth)acrylate is preferably used in an amount of 50 parts by weight of less per 100 parts by weight of total monomers. Thus, the polyfunctional (meth)acrylate (II) is used more preferably in an amount of 10 to 40 parts by weight and particularly preferably in an amount of 10 to 30 parts by weight, on the same basis as above.

Said "other copolymerizable vinyl monomers" include monofunctional monomers and polyfunctional monomers. Concrete examples of the monofunctional monomer include the following:

acrylic esters such as methyl acrylate, ethyl acrylate, propyl acrylate, n-butyl acrylate, i-butyl acrylate, t-butyl acrylate, pentyl acrylate, n-hexyl acrylate, 2-ethylhexyl acrylate, n-octyl acrylate, dodecyl acrylate, butoxyethyl acrylate, octadecyl acrylate, phenyl acrylate, benzyl acrylate, naphthyl acrylate, cyclopentyl acrylate, cyclohexyl acrylate, trimethylcyclohexyl acrylate, norbornyl acrylate, norbornylmethyl acrylate, isobornyl acrylate, bornyl acrylate, menthyl acrylate, phenthyl acrylate, adamantyl acrylate, dimethyladamantyl acrylate, tricyclo-[5.2.1.0$^{2.6}$]deca-8-yl acrylate, tricyclo[5.2.1.0$^{2.6}$]deca-4-methyl acrylate, cyclodecyl acrylate, glycerin monoacrylate and the like;

methacrylic esters such as methyl methacrylate, ethyl methacrylate, propyl methacrylate, n-butyl methacrylate, i-butyl methacrylate, t-butyl methacrylate, pentyl methacrylate, n-hexyl methacrylate, 2-ethylhexyl methacrylate, n-octyl methacrylate, dodecyl methacrylate, butoxyethyl methacrylate, octadecyl methacrylate, phenyl methacrylate, benzyl methacrylate, naphthyl methacrylate, cyclopentyl methacrylate, cyclohexyl methacrylate, methylcyclohexyl methacrylate, trimethylcyclohexyl methacrylate, norbornyl methacrylate, norbornylmethyl methacrylate, isobornyl methacrylate, bornyl methacrylate, menthyl methacrylate, phenthyl methacrylate, adamantyl methacrylate, dimethyladamantyl methacrylate, tricyclo[5.2.1.0$^{2.6}$]-deca-8-yl methacrylate, tricyclo[5.2.1.0$^{2.6}$]deca-4-methyl methacrylate, cyclodecyl methacrylate, glycerin monomethacrylate and the like;

aromatic vinyl compounds such as styrene, α-methylstyrene, α-ethylstyrene, α-fluorostyrene, α-chlorostyrene, α-bromostyrene, fluorostyrene, chlorostyrene, bromostyrene, methylstyrene, methoxystyrene and the like;

N-substitiuted maleimides such as N-methylmaleimide, N-ethylmaleimide, N-propylmaleimide, N-butylmaleimide, N-cyclohexylmaleimide, N-phenyl-maleimide, N-methylphenyl-maleimide, N-chlorophenyl-maleimide, N-methoxyphenylmaleimide, N-carboxyphenylmaleimide and the like;

(meth)acrylamides such as acrylamide, methacrylamide, N-dimethylacrylamide, N-diethylacrylamide, N-dimethylmethacrylamide, N-diethylmethacrylamide and the like;

(meth)acrylic acid metallic salts such as calcium acrylate, barium acrylate, lead acrylate, tin acrylate, zinc acrylate, calcium methacrylate, barium methacrylate, lead methacrylate, tin methacrylate, zinc methacrylate and the like;

unsaturated carboxylic acids such as acrylic acid, methacrylic acid and the like;

epoxy group-containing vinyl compounds such as glycidyl acrylate, glycidyl methacrylate and the like;

hydroxy group-containing vinyl compounds such as hydroxyethyl acrylate, hydroxyethyl methacrylate and the like; alkoxysilyl group-containing vinyl compounds such as γ-(methacriyloxypropyl)-trimethoxysilane and the like;

vinyl cyanide compounds such as acrylonitrile, methacrylonitrile and the like; etc. These compounds are used either in the form of a single compound or in the form of a mixture of two or more compounds.

Concrete examples of the polyfunctional monomer of the other polymerizable vinyl monomers include acrylic esters such as ethylene glycol diacrylate, glycerin diacrylate, glycerin triacrylate, 1,4-butanediol diacrylate, 1,6-hexanediol diacrylate, 1,9-nonanediol diacrylate, 1,10-decanediol diacrylate, 1,12-dodecanediol diacrylate, 1-acryloyl-2-hydroxy-3-acryloylpropane, pentaerythritol tetraacrylate, 1,1,1-trimethylolpropane triacrylate, dipentaerythritol hexaacrylate, hexamethylolmelamine hexaacrylate, N,N',N"-tris(2-acryloyloxyethyl) isocyanurate and the like;

methacrylic esters such as ethylene glycol dimethacrylate, glycerin dimethacrylate, glycerin trimethacrylate, 1,4-butanediol dimethacrylate, 1,6-hexanediol dimethacrylate, 1,9-nonanediol dimethacrylate, 1,10-decanediol dimethacrylate, 1,12-dodecanediol dimethacrylate, 1-methacryloyl-2-hydroxy-3-methacryloylpropane, pentaerythritol tetramethacrylate, 1,1,1-trimethylolpopane trimethacrylate, dipentaery-thritol hexamethacrylate, hexamethylolmelamine hexaacrylate, N,N',N"-tris(2-methacryloyloxyethyl) isocyanurate and the like;

allyl and allylidene compounds such as ethyleneglycolbis-allyl carbonate, diethyleneglycolbisallyl carbonate, triethyleneglycolbis-allyl carbonate, tetraethylene-glycolbis-allyl carbonate, pentaethylene-glycolbis-allyl carbonate, polypropyleneglycolbis-allyl carbonate, trimethyleneglycolbis-allyl carbonate, 3-hydroxy-propoxypropanolbis-allyl carbonate, glycerinbis-allyl carbonate, triglyceringbis-allyl carbonate, diallyl carbonate, diallylidene-pentaerythritol, triallylidenesorbitol, diallylidene-2,2,6,6-tetramethylolcyclohexanone, triallylidenehexamethylolmelamine, diallyliden,-D-glucose, Bisphenol A diallyl ether, Bisphenol S diallyl ether, ethyleneglycol diallyl ether, 1,1,1-trimethylolpropane triallyl ether, neopentylglycol triallyl ether, allyl acrylate, methallyl acrylate, vinyl acrylate, allyl methacrylate, methallyl methacrylate, vinyl methacrylate, diallyl phthalate (diallyl orthophthalate, diallyl isophthalate, diallyl terephthalte, and mixtures of two or more thereof), triallyl isocyanurate;

divinylbenzene; etc. These compounds are used either in the form of a single compound or in the form of a mixture of two or more compounds.

Among the above-mentioned other copolymerizable vinyl monomers, the monofunctional monomers which are preferable from the viewpoint of hue, strength at the time of boring processing, specific gravity, transparency and heat resistance are methacrylic esters such as methyl methacrylate, ethyl methacrylate, propyl methacrylate, n-butyl methacrylate, i-butyl methacrylate, t-butyl methacrylate, pentyl methacrylate, n-hexyl methacrylate, 2-ethylhexyl methacrylate, n-octyl methacrylate, butoxyethyl methacrylate, phenyl methacrylate, benzyl methacrylate, naphthyl methacrylate, methacrylic esters having a $C_5$–$C_{22}$ alicyclic hydrocarbon group in the ester part thereof, acrylic esters having a $C_5$–$C_{22}$ alicyclic hydrocarbon group in the ester part thereof; aromatic vinyl compounds such as styrene and the like; hydroxy group-containing vinyl compounds such as hydroxyethyl methacrylate and the like; alkoxysilyl group-containing vinyl compounds such as γ-(methacryl-oxypropyl)-trimethoxysilane and the like; etc. and the polyfunctional monomers which are preferable are straight chain alkylene glycol diacrylates such as ethylene glycol diacrylate, 1,4-butanediol diacrylate, 1,6-hexanediol diacrylate and the like and straight chain alkylene glycol dimethacrylates such as allyl methacrylate, methallyl methacrylate, ethylene glycol dimethacrylate, 1,4-butanediol dimethacrylate, 1,6-hexanediol dimethacrylate and the like.

As for the formulation of monomer mixture for producing the transparent resin mentioned above, it is preferable to compound 1 to 30 parts by weight, particularly 10 to 20 parts by weight, of the alkylene oxide group-containing monomer represented by the formula (I) with 1 to 39 parts by weight, particularly 0 to 30 parts by weight, of the polyfunctional (meth)acrylate represented by the formula (II), 15 to 60 parts by weight, particularly 30 to 50 parts by weight, of styrene and 0 to 60 parts by weight, particularly 0 to 30 parts by weight, of other copolymerizable vinyl monomer so as to give a total amount of 100 parts by weight.

If the amount of styrene is smaller than the above, it is difficult to obtain a high refractive index, particularly to make the refractive index higher than 1.54. If the amount of styrene is too large, a low optical dispersion is difficult to realize, and particularly an Abbe number of 35 or higher is difficult to realize, and the hue is apt to become yellowish.

If the amount of other copolymerizable vinyl monomer is too larvae, a high refractive index, particularly a refractive index of 1.54 or above, is difficult to maintain, and a low specific gravity, particularly a specific gravity of 1.15 or below, is difficult to maintain.

As the "other copolymerizable vinyl monomer", methacrylic esters and acrylic esters having $C_5$–$C_{22}$ alicyclic hydrocarbon group in the ester part thereof are preferable. Examples thereof include methacrylic esters such as cyclopentyl methacrylate, cyclohexyl methacrylate, methylcyclohexyl methacrylate, trimethylcyclohexyl methacrylate, norbornyl methacrylate, norbornylmethyl methacrylate, isobornyl methacrylate, bornyl methacrylate, menthyl methacrylate, phenthyl methacrylate, adamantyl methacrylate, dimethyladamantyl methacrylate, dimethyladamantyl methacrylate, tricyclo-[5.2.1.0$^{2,6}$]deca-8-yl methacrylate, tricyclo[5.2.1.0$^{2,6}$]-deca-4-methyl methacrylate, cyclodecyl methacrylate and the like and acrylic esters such as cyclopentyl acrylate, cyclohexyl acrylate, methylcyclohexyl acrylate, trimethylcyclohexyl acrylate, norbornyl acrylate, norbornylmethyl acrylate, isobornyl acrylate, bornyl acrylate, menthyl acrylate, phenthyl acrylate, adamantyl acrylate, dimethyladamantyl acrylate, tricyclo[5.2.1.0$^{2,6}$]deca-8-yl acrylate, tricyclo-[5.2.1.0$^{2,6}$]deca-4-methyl acrylate, cyclodecyl acrylate and the like. These vinyl monomers are used either in the form of a single monomer or in the form of a mixture of two or more monomers. Of these monomers, cyclohexyl methacrylate, norbornyl methacrylate, norbornylmethyl methacrylate, tricyclo[5.2.1.0$^{2,6}$]deca-8-yl methacrylate and tricyclo[5.2.1.0$^{2,6}$]deca-4-methyl methacrylate are preferable from this viewpoint of refractive index, Abbe number, specific gravity and hue, and tricyclo-[5.2.1.0$^{2,6}$]deca-8-yl methacrylate is particularly preferable.

Preferably, the methacrylic esters and acrylic esters having $C_5$–$C_{22}$ alicyclic hydrocarbon group in the ester part thereof are used in an amount of 1 to 50 parts by weight based on 100 parts by weight of the total monomer. If the amount of said methacrylic or acrylic ester is smaller than 1 part by weight, Abbe number is low, hue is yellowish, and specific gravity is high. If the amount exceeds 50 parts by weight, strength at the time of boring processing and impact resistance are apt to deteriorate. Thus, it is particularly preferable to use these monomers in an amount of 5 to 40 parts by weight per 100 parts by weight of total monomer.

It is preferable to use a hydroxy group-containing vinyl compound or an alkoxysilyl group-containing vinyl compound, which are both one of said other copolymerizable vinyl monomers, in an amount of at least 0.01 part by weight per 100 parts by weight of total monomer, beck, use adhesiveness to organosilane type hard coat film can be improved thereby.

In the production of transparent resin, conventional chain transfer agent, mercaptan, dialkyl disulfide, chloroform, carbon tetrachloride or the like may be used as a molecular weight regulator in the polymerization process. From the viewpoint of transparency, color and heat resistance of plastic lens, α-methylstyrene dimer is particularly preferably usable for this purpose. The molecular weight regulator is used in an amount of 0.1 to 10% by weight based on the total monomer. If its amount is smaller than 0.1% by weight, there arise various problems such as high haze rate, deposition of extraneous matter on the surface, readiness of colorization, decrease in strength, etc. If its amount exceeds 10% by weight, properties such as heat resistance deteriorate. Thus, it is particularly preferable to use the molecular weight regulator in an amount of 0.5 to 5% by weight based on the monomer mixture.

In the production of the transparent resin, conventional radical polymerization initiators can be used as they are.

Examples thereof include organic peroxides such as 1,1-bis (t-butylperoxy) -3,3,5-trimethylcyclohexaine, 1,1-bis (t-butylperoxy)-cyclohexane, n-butyl-4,4'-bis(t-butylperoxy)-valerate, decanoyl peroxide, lauroyl peroxide, benzoyl peroxide, m-toluyl peroxide, diisopropylperoxy dicarbonate, di-2-ethylhexylperoxy dicarbonate, di-n-propylperoxy dicarbonate, dimethoxyisopropylperoxy dicarbonate, cumylperoxy neodecanoate, t-butylperoxy-2-ethylhexanoate, t-butylperoxy-3,5,5-trimethylhexanoate, di-t-butyldiperoxy isophthalate, t-butylperoxyisopropyl carbonate and the like; azo type polymerization initiators such as 2,2'-azobis-(isobutyronitrile), 2,2'-azobis(4-methoxy-2,4-dimethylvaleronitrile), 2,2'-azobis (2,4-dimethylvaleronitrile), dimethyl-2,2'-azobisisobutyrate, 2,2'-azobis(2-methylbutyronitrile), 1,1'-azobis (1-cyclohexanecarbonitrile), 2-phenylazo-2,4-dimethyl-4-methoxyvaleronitrile, 2,2'-azobis (2-methyl-propane) and the like; etc. These polymerization initiators may be used in combination of two or more.

Preferably, the above-mentioned polymerization initiator is used in an amount ranging from 0.001 to 10 parts by weight per 100 parts by weight of total monomer. If the surface state of the resulting polymer and the polymerization time are taken into consideration, it is particularly preferable to use the initiators in an amount of 0.01 to 5 parts by weight per 100 parts by weight of total monomer.

In the production of the transparent resin, curing and forming is preferably carried out by the method of cast polymerization. For example, a monomer mixture containing the molecular weight regulator and polymerization initiator is poured into a mold made from two sheets of glass and a gasket, the whole is fixed with spring clips or the like if desired, and then the whole is heated to make progress curing and forming. Although the curing temperature varies with the kind of initiator, it is usually 15° C. to 120° C. Preferably, the polymerization is started at a relatively low temperature and the temperature is elevated after gelation in order to prevent the gasket material from corrosion by monomer mixture. The temperature at which the monomer mixture is gelatinized is preferably 35° C. or below, and particularly preferably 28° C. or below.

In the production of the transparent resin, the material constituting the gasket used in cast polymerization is selected from low-density polyethylene, plasticized polyvinyl chloride, ethylene-vinyl acetate copolymer, ethylene-acrylic ester copolymer, polyolefin type elastomer, polyester type elastomer, polyamide type elastomer and fluorinated elastomer.

The production of the transparent resin is preferably carried out in such a manner that nitrogen gas is bubbled until oxygen content in the liquid mixture has been reduced to 1.0 mg/liter or less, and thereafter the liquid mixture is poured into a glass mold and cured and formed by the method of cast polymerization, in order to prevent colorization and shorten the induction period. The cured lens having completed the main polymerization step and released from the mold is heat-treated at 120° C. for 1 to 2 hours. This heat treatment is preferably carried out in an atmosphere of inert gas in order to prevent colorization. By the cast polymerization process, a lens can be formed.

In putting the transparent resin of the present invention to use, an antioxidant of phosphite type, phenol type, thio ether type or the like, a mold release agent such as aliphatic alcohol, fatty acid ester, phthalic ester, triglyceride, fluorinated surfactant, higher fatty acid metallic salt or the like, as well as a slipper, a plasticizer, an antistatic agent, an ultraviolet absorber, a flame retardant, a heavy metal inactivator and the like, may be added to the resin for the purpose of preventing deterioration or improving heat stability and processing characteristics. These additives are preferably added in the course of polymerization.

The surface of the lens made of the transparent resin of the present invention may be coated with an inorganic compound such as $MgF_2$, $SiO_2$ or the like by the method of vacuum vapor deposition, sputtering, ion plating or the like, and a hard coat may be formed on the lens surface with an organosilicone compound such as silane coupler or the like, a vinyl monomer, a melamine resin, an epoxy resin, a fluorinated resin, a silicone resin or the like; whereby moisture resistance, optical characteristics, chemical resistance, abrasion resistance and defogging property of the lens can be improved.

On the surface of the lens made of the transparent resin (base material for a plastic lens), an organosilane type hard coat film or a cured film of organosilane resin may directly be laminated to make a plastic lens.

Said organosilane resin is an organosilane compound represented by the following formula (III):

$$R^8R^9_aSi(OR^{10})_{3-a} \qquad (III)$$

wherein $R^8$ is an organic group containing an epoxy group having 2 to 8 carbon atoms, $R^9$ is an alkyl group having 1 to 6 carbon atoms, an alkenyl group, a halogenated alkyl group or an allyl group, $R^{10}$ is a hydrogen atom, an alkyl group having 1 to 4 carbon atoms, an alkoxy-alkyl group or an acyl group, and a is 0, 1 or 2; or a partial hydrolyzate thereof. Concrete examples of said organosilane resin include organosilane compounds such as γ-glycidoxypropyltrimethoxysilane, γ-glycidoxy-propyltriethoxysilane, γ-glycidoxypropyl-tris(methoxyethoxy)silane, γ-glycidoxypropylmethyldimethoxy-silane, γ-glycidoxypropylmethyldiethoxysilane and the like, and partial hydrolyzates thereof. As a commercial product, KP64C (trade name, manufactured by Shin-Etsu Chemical Co., Ltd.) can be preferred to.

The organosilane resin mentioned above to which its 10 to 80% by weight of a colloidal solution prepared by dispersing inorganic fine particulate material such as antimony oxide sol, silica sol, titania sol, alumina sol or the like in water or an alcohol such as methanol, ethanol, isobutanol, diacetone alcohol or the like has previously been added is directly applied to the surface of the base material of plastic lens obtained above, and cured with heating at 50° to 140° C., whereby a hard coat layer can be formed. If desired, a primer layer may be formed between the surface of plastic lens and the hard coat layer or the surface of base material of plastic lens may be subjected to a surface treatment such as plasma treatment or the like. However, the base material of plastic lens obtained according to the present invention does not always require these pre-treatments.

As the inorganic fine particulate material, those having a particle diameter of 1 to 100 μm are preferable. Colloidal solutions dispersed in water or organic solvent which are commercially available usually may also be used.

If desired, a curing catalyst such as aluminum chelate, perchloric acid, perchlorates (for example, ammonium perchlorate, aluminum perchlorate and the like), alkali metal salts (for example, sodium acetate, potassium propionate and the like), quaternary ammonium salts (for example, tetramethylammonium hydroxide and the like), etc. may be added to the organosilane resin.

The lens made of the above-mentioned transparent resin can be dyed by dipping it in water in which a dye is dispersed.

As said dye, those conventionally used in this field of industry may be used directly. Examples thereof include C.

I. Disperse Red 13, 56 and 112; C. I. Disperse Yellow 3, 7, 31, 42, 54 and 198; C. I. Disperse Blue 1, 3, 5, 54, 56 and 197; etc.

In carrying out the dyeing, dyeing assistants such as pH regulator, wetting agent, surfactant, dispersion promotor, antifoaming agent and the like may be added, whereby color depth and uniformity of dyeing can be improved.

In carrying out the dyeing, an aromatic compound such as benzyl alcohol, phenol, butyl benzoate, methyl salicylate and the like, an aliphatic alcohol such as 1-butanol, ethyl cellosolve, cyclopentanol and the like, or an aliphatic ester such as butyl cellosolve acetate, methyl acetoacetate and the like may be added as a carrier, whereby color depth of dyeing can be improved.

Next, the present invention is explained more concretely with reference to examples, wherein parts and percents are by weight unless otherwise specified.

Examples 1 to 16

To a liquid mixture of the formulation shown in Table 1 were successively added 1.0 part of diisopropylperoxy dicarbonate and 0.1 part of t-butylperoxy isopropyl carbonate. After thoroughly stirring the resulting mixture, the mixture was poured into a mold constructed from two glass sheets and a gasket, gelled at 25° C., and heated to 90° C. The cured lens was released from the mold, heat-treated at 120° C. for 2 hours, and cooled to room temperature. Then, the lens was coated with an organosilane type hard coat agent (trade name "KP64C", manufactured by Shin-Etsu Chemical Co., Ltd.) by dipping method, and heated first at room temperature for 30 minutes, subsequently at 90° C. for 30 minutes, and finally at 120° C. for one hour to cure the hard coat film.

Comparative Examples 1 to 11

To a liquid mixture of the formulation shown in Table 2 were successively added 1.0 part of diiso-propylperoxy dicarbonate and 0.1 part of t-butylperoxy isopropyl carbonate. After thoroughly stirring the resulting mixture, the mixture was poured into a mold constructed from two glass sheets and a gasket, gelled at 25° C., and heated to 90° C. The cured lens was released from the mold, heat treated at 120° C. for 2 hours, and cooled to room temperature. Then, the lens was coated with an organosilane type hard coat agent (trade name "KP64C", manufactured by Shin-Etsu Chemical Co., Ltd.) by dipping method and heated first at room temperature for 30 minutes, subsequently at 90° C. for 30 minutes and finally at 120° C. for one hour to cure the hard coat layer.

On the lenses obtained in Examples 1 to 16 and Comparative Examples 1 to 11, refractive index, Abbe number, specific gravity, heat resistance, transparency, tensile strength in boring, hue, adhesiveness to hard coat and dyeability were evaluated. The results were as shown in Tables 3 and 4.

The properties were evaluated according to the following methods.

Refractive Index and Abbe Number: Measured with Abbe refractometer (manufactured by Atago Co.) at 20° C.

The values shown in Table 1 are those measured with D line (589.3 nm).

Specific Gravity: Measured by the water substitution method.

Heat Resistance: Ts (softening temperature), which is a temperature at which a needle begins to penetrate, and penetration of needle (thermal deformation) are measured with TMA (Thermal Mechanical Analyzer, manufactured by Seiko Electronics Co.).

Haze rate (transparency): Measured according to ASTM D 1003 on a lens having a central thickness of 5 mm. A smaller value means a more excellent transparency.

Tensile Strength in Boring: Holes having a diameter of 2.0 mm are perforated in both terminals of a lens having a thickness of 2 mm, bolts are introduced into the holes, and the bolts are stretched by means of tensile tester to measure strength.

Hue: YI value (yellowing index) is measured with Color Difference Meter (manufactured by Nippon Denshoku Co.).

Adhesiveness to Hard Coat: Eleven lines are carved in both the longitudinal and lateral directions on a hard coat film by means of a knife. After attaching a cellophane tape (manufactured by Nichiban Co.) thereto, the cellophane tape is quickly peeled off, and the number of squares left unpeeled is counted.

○: 100/100 to 80/100 x: 0/100 to 20/100

Dyeability: In one liter of pure water are dissolved 5 g of a dye, 2 ml of a dyeing assistant and 10 g of benzyl methacrylate. After heating the solution to 90° C., a lens is dipped in the solution for 15 minutes for the sake of dyeing. The extent of dyeing after the dyeing process is evaluated in five stages and expressed by the following marks:

5: Very well dyeable,

4: Well dyeable,

3: Somewhat dyeable,

2: Slightly dyeable,

1: Hardly dyeable.

In the tables shown below, meanings of the marks are as follows:

ST styrene
MMA: methylmethacrylate
TCDMA: tricyclo[5.2.1.0$^{2.6}$]deca-8-yl methacrylate
NPDM: 2,2-dimethyl-1,3-propanediol dimethacrylate
NPDA: 2,2-dimethyl-1,3-propanediol diacrylate,
9EGDM: nonaethylene glycol dimethacrylate
14EGDM: tetradecaethylene glycol dimethacrylate
9EGMM: nonaethylene glycol monomethacrylate
HEMA: 2-hydroxyethyl methacrylate
EGDM: ethylene glycol dimethacrylate
4EGDM: tetraethylene glycol dimethacrylate
4EDGM: tetraethylene glycol dimethacrylate
DDDM: 1,10-decanediol dimethacrylate
αMSD: α-methylstryrene dimer
NOM: n-octylmercaptan
provided that the amounts of α-MSD and NOM are expressed in terms of % by weight based on total monomer, and
CHMA: cyclohexcyl methacrylate.

TABLE 1

| | Formulation of liquid mixture | | | | | | | | | α-MSD |
|---|---|---|---|---|---|---|---|---|---|---|
| | Monomer composition (% by wt.) | | | | | | | | | |
| | ST | MMA | TCDMA | NPDM | NPDA | 9EGDM | 14EGDM | 9EGMM | HEMA | (% by wt.) |
| Example 1 | 50 | 15 | — | 20 | — | 15 | — | — | — | 1.0 |
| Example 2 | 50 | 15 | — | 20 | — | — | 15 | — | — | 1.0 |
| Example 3 | 50 | 15 | — | — | 20 | 15 | — | — | — | 1.0 |
| Example 4 | 50 | 15 | — | — | 20 | — | 15 | — | — | 1.0 |
| Example 5 | 50 | — | 15 | 20 | — | 15 | — | — | — | 1.0 |
| Example 6 | 50 | — | 15 | 20 | — | — | 15 | — | — | 1.0 |
| Example 7 | 50 | — | 15 | — | 20 | 15 | — | — | — | 1.0 |
| Example 8 | 50 | — | 15 | — | 20 | — | 15 | — | — | 1.0 |
| Example 9 | 50 | — | 15 | 20 | — | — | 15 | — | — | NOM 1.0 |
| Example 10 | 50 | — | 15 | 20 | — | — | 15 | — | — | — |
| Example 11 | 50 | — | 14 | 20 | — | — | 15 | — | 1.0 | 1.0 |
| Example 12 | 41 | 24 | — | 20 | — | 15 | — | — | — | 1.0 |
| Example 13 | 41 | 24 | — | 20 | — | — | 15 | — | — | 1.0 |
| Example 14 | 41 | — | 24 | 20 | — | 15 | — | — | — | 1.0 |
| Example 15 | 41 | — | 24 | 20 | — | — | 15 | — | — | 1.0 |
| Example 16 | 50 | | 15 | 20 | — | — | — | 15 | — | 1.0 |

TABLE 2

| | Formulation of liquid mixture | | | | | | | | α-MSD |
|---|---|---|---|---|---|---|---|---|---|
| | Monomer composition (% by wt.) | | | | | | | | |
| | ST | MMA | TCDMA | NPDM | EGDM | 4EGDM | DDDM | 14EGMM | (% by wt.) |
| Comparative Example 1 | 50 | 30 | — | — | 20 | — | — | — | 1.0 |
| Comparative Example 2 | 50 | — | 30 | — | 20 | — | — | — | 1.0 |
| Comparative Example 3 | 50 | — | 30 | 20 | — | — | — | — | 1.0 |
| Comparative Example 4 | 50 | — | 30 | — | — | — | 20 | — | 1.0 |
| Comparative Example 5 | 50 | — | 30 | — | — | — | — | 20 | 1.0 |
| Comparative Example 6 | 50 | 15 | — | — | 20 | — | — | 15 | 1.0 |
| Comparative Example 7 | 50 | 15 | — | — | — | — | 20 | 15 | 1.0 |
| Comparative Example 8 | 50 | — | 15 | — | 20 | — | — | 15 | 1.0 |
| Comparative Example 9 | 50 | — | 15 | — | — | — | 20 | 15 | 1.0 |
| Comparative Example 10 | 50 | — | 15 | 20 | — | — | 15 | — | 1.0 |
| Comparative Example 11 | 50 | — | 15 | 20 | — | 15 | — | — | 1.0 |

TABLE 3

| | Results of evaluation | | | | | | | | | |
|---|---|---|---|---|---|---|---|---|---|---|
| | Refractive index (—) | Abbe number (—) | Specific gravity (g/cm³) | Ts (°C.) | Penetration of needle (μm) | Haze rate (%) | Strength (kgf) | YI (%) | Adhesiveness to hard coat | Dyeability (1–5) |
| Example 1 | 1.55 | 41 | 1.11 | 121 | 1 | 0.5 | 15 | 1.2 | ○ | 3 |
| Example 2 | 1.55 | 41 | 1.11 | 116 | 1 | 0.5 | 20 | 1.1 | ○ | 5 |
| Example 3 | 1.55 | 41 | 1.11 | 109 | 2 | 0.5 | 15 | 1.2 | ○ | 4 |
| Example 4 | 1.55 | 41 | 1.11 | 106 | 3 | 0.5 | 20 | 1.1 | ○ | 5 |
| Example 5 | 1.55 | 41 | 1.10 | 122 | 1 | 0.5 | 15 | 1.2 | ○ | 3 |
| Example 6 | 1.55 | 41 | 1.10 | 117 | 1 | 0.5 | 20 | 1.1 | ○ | 5 |
| Example 7 | 1.55 | 41 | 1.10 | 110 | 2 | 0.5 | 15 | 1.2 | ○ | 4 |
| Example 8 | 1.55 | 41 | 1.10 | 106 | 3 | 0.5 | 20 | 1.1 | ○ | 5 |

TABLE 3-continued

| | Results of evaluation | | | | | | | | |
|---|---|---|---|---|---|---|---|---|---|
| | Refractive index (—) | Abbe number (—) | Specific gravity (g/cm$^3$) | Ts (°C.) | Penetration of needle (μm) | Haze rate (%) | Strength (kgf) | YI (%) | Adhesiveness to hard coat | Dyeability (1–5) |
| Example 9 | 1.55 | 41 | 1.10 | 117 | 1 | 0.5 | 20 | 1.3 | ○ | 5 |
| Example 10 | 1.55 | 41 | 1.10 | 120 | 1 | 0.5 | 20 | 1.3 | ○ | 5 |
| Example 11 | 1.55 | 41 | 1.10 | 120 | 1 | 0.5 | 20 | 1.1 | ○ | 5 |
| Example 12 | 1.55 | 42 | 1.12 | 122 | 1 | 0.5 | 15 | 1.2 | ○ | 3 |
| Example 13 | 1.55 | 42 | 1.12 | 116 | 1 | 0.5 | 20 | 1.1 | ○ | 5 |
| Example 14 | 1.55 | 42 | 1.11 | 123 | 1 | 0.5 | 15 | 1.1 | ○ | 3 |
| Example 15 | 1.55 | 42 | 1.11 | 119 | 1 | 0.5 | 20 | 1.0 | ○ | 5 |
| Example 16 | 1.55 | 41 | 1.10 | 110 | 25 | 0.5 | 12 | 1.3 | ○ | 5 |

TABLE 4

| | Results of evaluation | | | | | | | | |
|---|---|---|---|---|---|---|---|---|---|
| | Refractive index (—) | Abbe number (—) | Specific gravity (g/cm$^3$) | Ts (°C.) | Penetration of needle (μm) | Haze rate (%) | Strength (kgf) | YI (%) | Adhesiveness to hard coat | Dyeability (1–5) |
| Comparative Example 1 | 1.55 | 41 | 1.15 | 147 | 5 | 0.5 | 5 | 1.3 | × | 1 |
| Comparative Example 2 | 1.55 | 41 | 1.13 | 148 | 5 | 0.5 | 5 | 1.3 | × | 1 |
| Comparative Example 3 | 1.55 | 41 | 1.09 | 127 | 20 | 0.5 | 5 | 1.2 | × | 1 |
| Comparative Example 4 | 1.55 | 41 | 1.11 | 86 | 32 | 0.5 | 5 | 1.2 | × | 5* |
| Comparative Example 5 | 1.55 | 41 | 1.13 | 88 | 48 | 0.5 | 20 | 1.3 | ○ | 5* |
| Comparative Example 6 | 1.55 | 41 | 1.16 | 137 | 1 | 0.5 | 15 | 1.3 | ○ | 2 |
| Comparative Example 7 | 1.55 | 41 | 1.13 | 68 | 16 | 0.5 | 12 | 1.3 | ○ | 5* |
| Comparative Example 8 | 1.55 | 41 | 1.16 | 137 | 1 | 0.5 | 20 | 1.3 | ○ | 3 |
| Comparative Example 9 | 1.55 | 41 | 1.13 | 62 | 17 | 0.5 | 12 | 1.3 | ○ | 5* |
| Comparative Example 10 | 1.55 | 41 | 1.10 | 113 | 1 | 0.5 | 5 | 1.1 | × | 1 |
| Comparative Example 11 | 1.55 | 41 | 1.11 | 131 | 1 | 0.5 | 5 | 1.3 | ○ | 1 |

*: The lens was discolored during the dyeing process.

Since the transparent resin of the present invention is excellent in transparency, strength at the time of boring and dyeability, low in specific gravity and excellent in adhesiveness to organosilane resin, it can directly be coated with cured film of an organosilane resin (organosilane type hard coat film) without surface treatment. Further, a transparent resin of the present invention of which monomer formulation is modified exhibits, in addition to the effect of the transparent resin itself, a high refractive index, a low dispersibility (high Abbe number), an excellent hue and a high heat resistance. Further, since the transparent resin obtained according to the process of the present invention is excellent in transparency, strength at the time of boring and dyeability, low in specific gravity and excellent in the adhesiveness to organosilane resin, it can directly be coated with a cured film of an organosilane resin (organosilane type hard coat film) without surface treatment. Further, a transparent resin of which monomer formulation is modified exhibits, in addition to the effect of the transparent resin itself, a high refractive index, a low dispersibility (high Abbe number), an excellent hue and a high heat resistance.

Further, since the plastic lens of the present invention is excellent in transparency, strength at the time of boring and dyeability, low in specific gravity and excellent in adhesiveness to organosilane resin, it can directly be coated with a cured film of organosilane resin (organosilane type hard coat film) without surface treatment. Further, by modifying the formulation of monomer, there can be provided a plastic lens exhibiting, in addition to the above-mentioned effects, a high refractive index, a low dispersibility (high Abbe number), an excellent hue and a high heat resistance.

What is claimed is:

1. A plastic lens made of a transparent resin obtained by polymerizing a polymerizable monomer mixture comprising 1 to 80 parts by weight of an alkylene oxide group-containing monomer represented by the formula (I):

wherein $R^1$ is an acryloyl group or a methacryloyl group; $R^2$ is an alkylene group having 1 to 5 carbon atoms; $R^3$ is a hydrogen atom, an acryloyl group, methacryloyl group or a monovalent hydrocarbon group other than mentioned above and having 1 to 40 carbon atoms; and n is an integer of 9 to 50; 1 to 95 parts by weight of a polyfunctional (meth)acrylate represented by the formula (II):

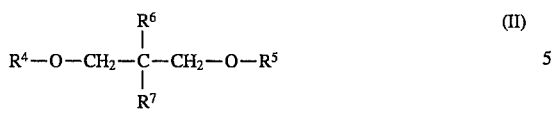

wherein $R^4$ and $R^5$ are independently an acryloyl group or a methacryloyl group; and $R^6$ and $R^7$ are independently a monovalent hydrocarbon group having 1 to 6 carbon atoms; and 0 to 90 parts by weight of other copolymerizable vinyl monomer so as to give a total amount of 100 parts by weight.

2. A plastic lens according to claim 1, wherein said polymerizable monomer mixture is a mixture comprising 1 to 30 parts by weight of the alkylene oxide group-containing monomer represented by the formula (I), 1 to 39 parts by weight of the polyfunctional (meth)acrylate represented by the formula (II), 15 to 60 parts of styrene and 0 to 60 parts by weight of other copolymerizable vinyl monomer so as to give a total amount of 100 parts by weight.

3. A plastic lens according to claim 1, wherein the alkylene oxide group-containing monomer of the formula (I) is at least one polyfunctional monomer or monofunctional monomer having an acryloyl group or a methacryloyl group as $R^3$.

4. A plastic lens according to claim 3, wherein the polyfunctional monomer is at least one member selected from the group consisting of polymethylene glycol diacrylates, polymethylene glycol dimethacrylates, polyethylene glycol diacrylates, polyethylene glycol dimethacrylates, polypropylene glycol diacrylates, polypropylene glycol dimethacrylates, polybutylene glycol diacrylates, polybutylene glycol dimethacrylates, polyethylene glycol polypropylene glycol diacrylates, polyethylene glycol propylene glycol dimethacrylates, polyethylene glycol polybutylene glycol diacrylates, and polyethylene glycol polybutylene glycol dimethacrylates.

5. A plastic lens according to claim 1, wherein the polyfunctional (meth)acrylate of the formula (II) is 2,2-dimethyl-1,3-proanediol diacrylate, 2,2-dimethyl-1,3-propanediol dimethacrylate, 2-methyl-2-ethyl-1,3-propanediol dimethacrylate, 2-methyl-2-isopropyl-1,3-propanediol dimethacrylate, 2-methyl-2-propyl-1,3-propanediol dimethacrylate, 2,2-diethyl-1,3-propanediol dimethacrylate, or a mixture thereof.

6. A plastic lens according to claim 1, wherein the alkylene oxide group-containing monomer of the formula (I) is tetradecaethylene glycol diacrylate or tetradecaethylene glycol dimethacrylate.

7. A plastic lens according to claim 2, wherein the alkytene oxide group-containing monomer of the formula (I) is at least one polyfunctional monomer or monofunctional monomer having an acryloyl group or a methacryloyl group as $R^3$.

8. A plastic lens according to claim 7, wherein the polyfunctional monomer is at least one member selected from the group consisting of polymethylene glycol diacrylates, polymethylene glycol dimethacrylates, polyethylene glycol diacrylates, polyethylene glycol dimethacrylates, polypropylene glycol diacrylates, polypropylene glycol dimethacrylates, polybutylene glycol diacrylates, polybutylene glycol dimethacrylates, polyethylene glycol polypropylene glycol diacrylates, polyethylene glycol propylene glycol dimethacrylates, polyethylene glycol polybutylene glycol diacrylates, and polyethylene glycol polybutylene glycol dimethacrylates.

9. A plastic lens according to claim 2, wherein the polyfunctional (meth)acrylate of the formula (II) is 2,2-dimethyl-1,3-propanediol diacrylate, 2,2-dimethyl-1,3-propanediol dimethacrylate, 2-methyl-2-ethyl-1,3-propanediol dimethacrylate, 2-methyl-2-isopropyl-1,3-propanediol dimethacrylate, 2-methyl-2-propyl-1,3-propanediol dimethacrylate, 2,2-diethyl-1,3-propanediol dimethacrylate, or a mixture thereof.

10. A plastic lens according to claim 2, wherein the alkylene oxide group-containing monomer of the formula (I) is tetradecaethylene glycol diacrylate or tetradecaethylene glycol dimethacrylate.

* * * * *